(12) United States Patent
Guo et al.

(10) Patent No.: US 12,078,836 B2
(45) Date of Patent: *Sep. 3, 2024

(54) LIGHT GUIDE PLATE ASSEMBLY, BACKLIGHT MODULE AND DISPLAY DEVICE

(71) Applicant: Shanghai Tianma Micro-Electronics Co., Ltd., Shanghai (CN)

(72) Inventors: Zhanxiang Guo, Shanghai (CN); Yumin Xu, Shanghai (CN); Binbin Chang, Shanghai (CN); Zhaoxing Gao, Shanghai (CN); Wanzhen Wang, Shanghai (CN); Weiyang Sun, Shanghai (CN); Jianguo Bian, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/530,456

(22) Filed: Dec. 6, 2023

(65) Prior Publication Data

US 2024/0134105 A1    Apr. 25, 2024

Related U.S. Application Data

(63) Continuation of application No. 18/297,318, filed on Apr. 7, 2023, now Pat. No. 11,874,487.

(30) Foreign Application Priority Data

Nov. 9, 2022 (CN) .......................... 202211399410.9

(51) Int. Cl.
*F21V 8/00* (2006.01)
(52) U.S. Cl.
CPC ......... *G02B 6/0018* (2013.01); *G02B 6/0021* (2013.01); *G02B 6/0031* (2013.01)
(58) Field of Classification Search
CPC ... G02B 6/0018; G02B 6/0021; G02B 6/0031
See application file for complete search history.

(56) References Cited

U.S. PATENT DOCUMENTS 11,874,487 B2 * 1/2024 Guo .................... G02B 6/0018
2012/0328242 A1 * 12/2012 Hesse .................. G02B 6/002
385/36

(Continued)

*Primary Examiner* — Mary Ellen Bowman
(74) *Attorney, Agent, or Firm* — CHRISTENSEN O'CONNOR JOHNSON KINDNESS PLLC

(57) ABSTRACT

Provided are a light guide plate assembly, a backlight module, and a display device, which relate to the field of display technologies, and improve uniformity of the light intensity of light emitted from different areas in the light guide plate assembly. The light guide plate assembly includes a reflection portion having an aperture; and a transmission portion. At least part of the transmission portion is located in the aperture. The transmission portion includes a converging portion and a diverging portion. A curvature of a surface of the converging portion adjacent to a light-incoming side of the light guide plate assembly is greater than or equal to 0, and a curvature of a surface of the diverging portion adjacent to the light-incoming side of the light guide plate assembly is smaller than or equal to 0.

20 Claims, 8 Drawing Sheets

(56) References Cited

U.S. PATENT DOCUMENTS

2022/0139648 A1\* 5/2022 Huang .................. H01H 13/83
 345/170
2023/0176272 A1\* 6/2023 Shinomiya ........... G02B 6/0021
 362/84

\* cited by examiner

LIGHT GUIDE PLATE ASSEMBLY, BACKLIGHT MODULE AND DISPLAY DEVICE

CROSS-REFERENCE TO RELATED APPLICATION

This application is a continuation of U.S. application Ser. No. 18/297,318, filed on Apr. 7, 2023, which claims priority to Chinese Patent Application No. 202211399410.9, filed on Nov. 9, 2022, the content of which is incorporated herein by reference in its entirety.

TECHNICAL FIELD

The present disclosure relates to the field of display technologies, and particularly, to a light guide plate assembly, a backlight module and a display device.

BACKGROUND

With the development of display technologies, flat panel devices such as LCD (Liquid Crystal Display) panels are widely used in various electronic products such as cell phones, TVs, digital cameras, and notebook computers due to the advantages of a high quality, power saving, and a wide application range, and thus have become a mainstream of display devices.

Since the liquid crystal display panel itself does not emit light, the LCD display panel needs to be used together with a backlight module. However, the backlight module in the related art has a problem of uneven brightness.

SUMMARY

In an aspect, the present disclosure provides a light guide plate assembly. The light guide plate assembly includes a reflection portion having an aperture; and a transmission portion. At least part of the transmission portion is located in the aperture. The transmission portion includes a converging portion and a diverging portion; a curvature of a surface of the converging portion adjacent to a light-incoming side of the light guide plate assembly is greater than or equal to 0, and a curvature of a surface of the diverging portion adjacent to the light-incoming side of the light guide plate assembly is smaller than or equal to 0.

In another aspect, the present disclosure provides a backlight module. The backlight module includes a light-emitting element and the light guide plate assembly described above. The light guide plate assembly is located at a light-exiting side of the light-emitting element.

In another aspect, the present disclosure provides a display device. The display device includes a display panel and the backlight module described above. The display panel is located at a light-exiting side of the backlight module.

BRIEF DESCRIPTION OF DRAWINGS

In order to more clearly illustrate technical solutions of embodiments of the present disclosure, the accompanying drawings used in the embodiments are described below. The drawings described below are merely a part of the embodiments of the present disclosure. Based on these drawings, those skilled in the art can obtain other drawings.

DESCRIPTION OF EMBODIMENTS

In order to better illustrate technical solutions of the present disclosure, the embodiments of the present disclosure are described in details with reference to the drawings.

It should be noted that the described embodiments are merely part of the embodiments of the present disclosure rather than all of the embodiments. All other embodiments obtained by those skilled in the art shall fall into the protection scope of the present disclosure.

The terms used in the embodiments of the present disclosure are merely for the purpose of describing specific embodiment, rather than limiting the present disclosure. The terms "a", "an", "the" and "said" in a singular form in the embodiments of the present disclosure and the attached claims are also intended to include plural forms thereof, unless noted otherwise.

It should be understood that the term "and/or" used in the context of the present disclosure is to describe a correlation relation of related objects, indicating that there can be three relations, e.g., A and/or B can indicate only A, both A and B, and only B. In addition, the symbol "/" in the context generally indicates that the relation between the objects in front and at the back of "/" is an "or" relationship.

Figure 1:
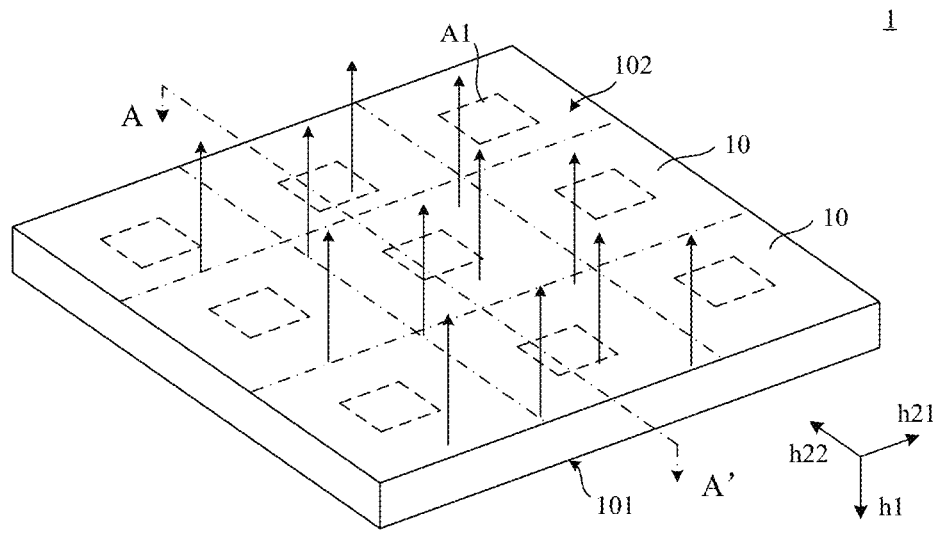
FIG. 1 is a perspective diagram of a light guide plate assembly according to an embodiment of the present disclosure.

The embodiments of the present disclosure provide a light guide plate assembly. FIG. 1 is a perspective diagram of a light guide plate assembly 1 according to an embodiment of the present disclosure. As shown in FIG. 1, the light guide plate assembly 1 has a light-incoming side 101 and a light-exiting side 102 that are opposite to each other along a thickness direction h1 of the light guide plate assembly 1. The light guide plate assembly 1 can transmit light emitted from a light-emitting element, so that the light emitted from the light-emitting element comes to the light-incoming side 101 of the light guide plate assembly 1, and exits from the light-exiting side 102 of the light guide plate assembly 1. In FIG. 1, arrows passing through the light guide plate assembly 1 are used to indicate a propagation direction of the light passing through the light guide plate assembly 1. When the light guide plate assembly 1 and the light-emitting element together form a backlight module, the light-emitting element can be disposed at a side adjacent to the light-incoming side 101 side of the light guide plate assembly 1.

Figure 2:
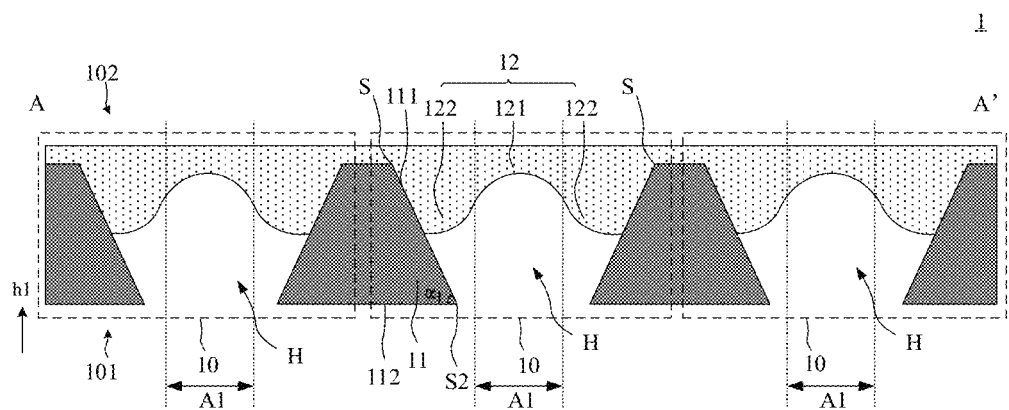
FIG. 2 shows a sectional view along AA' in FIG. 1 according to an embodiment of the present disclosure.

FIG. 2 shows a sectional view along AA' in FIG. 1 according to an embodiment of the present disclosure. In combination with FIG. 1 and FIG. 2, the light guide plate assembly 1 includes light guide plate units 10 that are arranged in an array in a direction parallel to a plane of the light guide plate assembly 1. As shown in FIG. 1, a first direction h21 and a second direction h22 intersect to define the plane of the light guide plate assembly 1.

As shown in FIG. 1 and FIG. 2, the light guide plate unit 10 has a light-emitting element disposing area A1. The light-emitting element disposing area A1 is configured to dispose the light-emitting element. Exemplarily, when the light guide plate assembly 1 and a backlight source together form a backlight module, according to some embodiments of the present disclosure, the light-emitting elements in the backlight source and the light guide plate units can be arranged in a one-to-one correspondence. In combination with FIG. 3, which is a sectional view of a backlight module 100 according to an embodiment of the present disclosure, the light-emitting element 30 is located in the light-emitting element disposing area A1.

Figure 3:
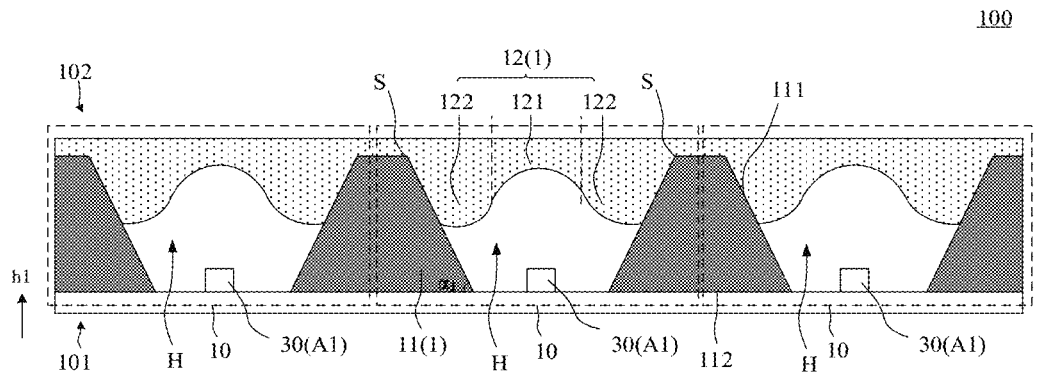
FIG. 3 is a sectional view of a backlight module according to an embodiment of the present disclosure.

As shown in FIG. 2 and FIG. 3, the light guide plate unit 10 further includes a reflection portion 11 and a transmission portion 12. The reflection portion 11 is configured to reflect light emitted from the light-emitting element (not shown in FIG. 2). The transmission portion 12 is configured to transmit light emitted from the light-emitting element (not shown in FIG. 2). The reflectivity of the reflection portion 11 is greater than the reflectivity of the transmission portion 12. The transmittance of the transmission portion 12 is greater than the transmittance of the reflection portion 11.

In some embodiments of the present disclosure, as shown in FIG. 2 and FIG. 3, the reflection portion 11 has an aperture H. At least part of the transmission portion 12 is located in the aperture H. The above-mentioned light-emitting element disposing area A1 is located in the aperture H. As shown in FIG. 3, when the light guide plate assembly 1 is used in the backlight module 100, the light-emitting element 30 in the backlight module 100 can be disposed in the aperture H.

As shown in FIG. 2 and FIG. 3, the transmission portion 12 includes a diverging portion 121 and a converging portion 122. The diverging portion 121 is configured to make light that enters the diverging portion 121 diverge towards a direction away from the center of the aperture H. The converging portion 122 is configured to make light that enters the converging portion 122 converge towards a direction away from the center of the aperture H. Exemplarily, the converging portion 122 can make light that enters the converging portion 122 converge towards an edge S of the aperture H. The edge S of the aperture H refers to an edge located at a side of the aperture H adjacent to the light-exiting side 102 of the light guide plate assembly 1.

Figure 4:
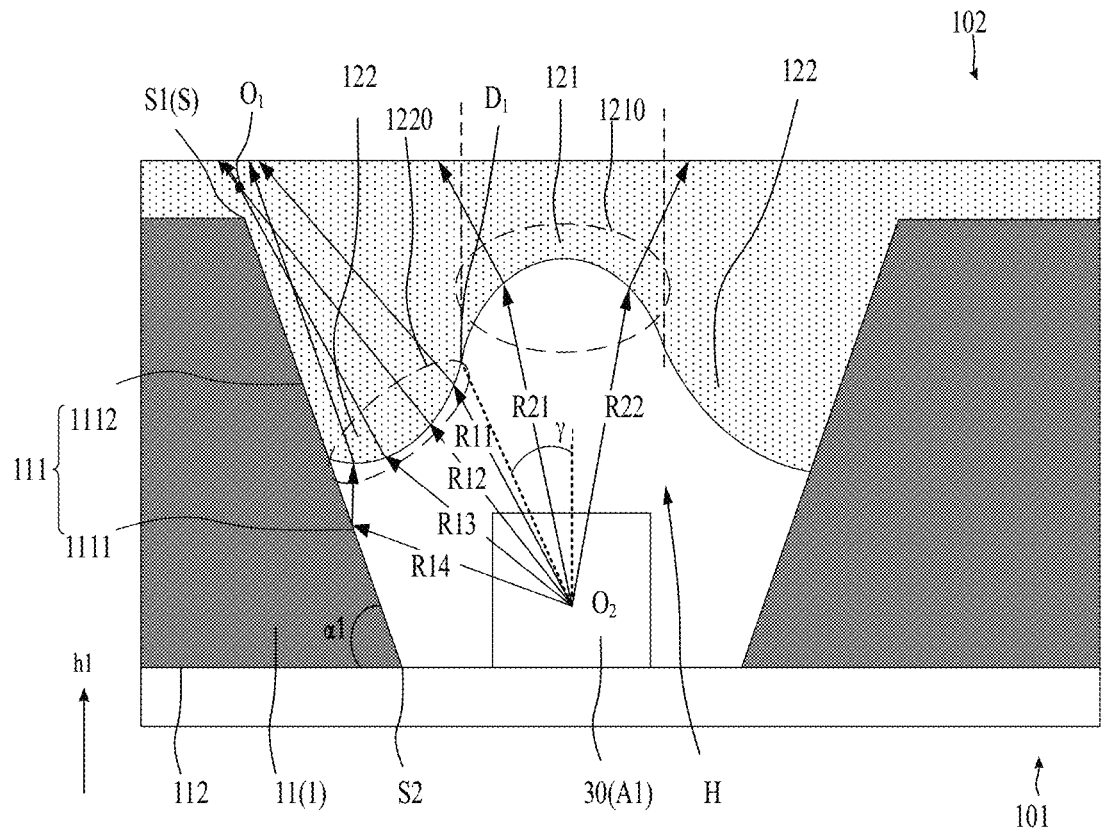
FIG. 4 is an enlarged schematic diagram of a light guide plate unit according to an embodiment of the present disclosure.

FIG. 4 is an enlarged schematic diagram of a light guide plate unit according to an embodiment of the present disclosure. When lighting the backlight module 100, referring to FIG. 3 and FIG. 4, light emitted from the light-emitting element 30 is refracted when passing through the converging portion 122, so that the exiting light can deflect towards a direction adjacent to the edge S of the aperture H relative to the incoming light. That is, multiple beams of light passing through the converging portion 122 can converge towards a position adjacent to the edge S of the aperture H. Light emitted from the light-emitting element 30 is refracted when passing through the diverging portion 121, and the exiting light can deflect towards a direction adjacent to the edge S of the aperture H relative to the incoming light. That is, multiple beams of light passing through the diverging portion 121 can diverge towards a direction away from the center of the aperture H.

According to the embodiments of the present disclosure, the light guide plate assembly 1 includes the transmission portion 12 and the reflection portion 11, and the reflection portion 11 has an aperture H in which at least part of the transmission portion 12 is located. In this case, when the light guide plate assembly 1 is applied to a backlight module, the light-emitting element can also be disposed in the aperture H. With such a configuration, small-angle light emitted from the light-emitting element can exit after passing through the transmission portion 12 located in the corresponding aperture H, large-angle light emitted from the light-emitting element is reflected by the reflection portion 11 and the reflected light exits after passing through the transmission portion corresponding to the reflection surface, so that the large-angle light can be prevented from being directed to a position of the other light-emitting element, thereby avoiding the mutual crosstalk of light emitted from different light-emitting elements. Moreover, with such a configuration, the light intensity of light emitted from an area where a non-aperture position of the reflection portion in the light guide plate assembly is located can be improved, which is conducive to improving the uniformity of the light intensity of light emitted from different areas in the light guide plate assembly.

In addition, in the embodiments of the present disclosure, the transmission portion 12 includes the diverging portion 121 and the converging portion 122. The diverging portion 121 can make light that enters the diverging portion 121 be diverged towards a direction away from the center of the aperture H, and the converging portion 122 can make light that enters the converging portion 122 be converged towards a direction away from the center of the aperture H. Based on such a configuration, when the light guide plate assembly 1 is applied to the backlight module, the light intensity of light emitted from an area adjacent to the edge S of the aperture of the reflection portion in the light guide plate assembly 1 can be further improved to balance the light intensity of light emitted from different positions such as an area (such as the center of the aperture) provided with the light-emitting element and an area (such as the edge of the aperture) not provided with the light-emitting element in the aperture H, so that it can eliminate a visible mesh pattern caused by uneven light intensity, thereby improving the display effect of the display device including the light guide plate assembly 1.

Moreover, based on the configuration manner provided by the embodiments of the present disclosure, a visible mesh pattern can be avoided without needing to provide a diffusion plate in the light guide plate assembly, thereby being conducive to saving the cost of the light guide plate assembly 1 and reducing the thickness of the light guide plate assembly 1.

When the diverging portion 121 and the converging portion 122 are disposed, exemplarily, as shown in FIG. 2, FIG. 3, and FIG. 4, the diverging portion 121 in the light guide plate unit 10 is disposed to correspond to the above-mentioned light-emitting element disposing area A1. That is, an orthographic projection of the diverging portion 121 on the plane of the light guide plate assembly 1 is located in the light-emitting element disposing area A1. The converging portion 122 is disposed to avoid the light-emitting element disposing area A1. That is, the orthographic projection of the converging portion 122 on the plane of the light guide plate assembly is disposed to avoid the light-emitting element disposing area A1.

Exemplarily, as shown in FIG. 2, FIG. 3, and FIG. 4, in some embodiments of the present disclosure, the converging portion 122 can be disposed adjacent to the edge S of the aperture H. When the light guide plate assembly 1 and the light-emitting element 30 together form a backlight module 100, and when the light-emitting element 30 is disposed corresponding to the center of the aperture H, the converging portion 122 and the light-emitting element 30 can be misaligned with each other in a thickness direction h1 of the light guide plate assembly 1, as shown in FIG. 3, and FIG. 4. Such a configuration can make more large-angle light be directed to the converging portion 122. In some embodiments of the present disclosure, a light-exiting angle refers to an acute angle formed between a propagation direction of light emitted from the light-emitting element 30 and the thickness direction of the light guide plate assembly 1. The large-angle light refers to light emitted from the light-emitting element 30 that has a large angle between the light and the thickness direction h1 of the light guide plate assembly 1. Taking the large-angle light R11, R12, and R13 shown in FIG. 4 as an example, in a process during which these light passes through the light guide plate assembly 1, these light can be converged towards the edge S of the aperture H due to the converging portion 122. Based on the configuration manner provided by the embodiments of the present disclosure, the large-angle light can be used to increase the light intensity at the position of the edge S of the aperture H, the utilization rate of the large-angle light can be increased, and the large-angle light can be prevented from further being directed to an area where other light-emitting components 30 are located, that is, avoiding the mutual crosstalk of the light emitted from different light-emitting elements 30.

Exemplarily, as shown in FIG. 2, FIG. 3, and FIG. 4, in some embodiments of the present disclosure, the diverging portion 121 is disposed corresponding to the center of the aperture H. When the light guide plate assembly 1 and the light-emitting element 30 together form a backlight module 100, as mentioned above, in the embodiments of the present disclosure, the light-emitting element 30 is disposed corresponding to the center of the aperture H, and the diverging portion 121 is disposed corresponding to the center of the aperture H, so that small-angle light can be directed to the diverging portion 121 as much as possible. Herein, the small-angle light refers to light having a small angle emitted from the light-emitting element 30 that has a small angle formed between the light and the thickness direction h1 of the light guide plate assembly 1. Taking the small-angle light R21 and R22 shown in FIG. 4 as an example, in a process during which the light passes through the light guide plate assembly 1, the light can be diverged towards a direction away from the center of the aperture H due to the diverging portion 121. Compared with the large-angle light, the small-angle light emitted from the light-emitting element 30 has larger light intensity. In some embodiments of the present disclosure, the diverging portion 121 diverges the small-angle light emitted from the light-emitting element 30, so that the amount of small-angle light emitted to the center of the aperture H is reduced, and the light intensity at the center of the aperture H is reduced. In this way, the light intensity at the center of the aperture H tend to be consistent with the light intensity at the edge of the aperture H.

In some embodiments, as shown in FIG. 2, FIG. 3, and FIG. 4, the reflection portion 11 includes a reflection surface 111 and a bottom surface 112 located at a side adjacent to a light-incoming side of the light guide plate assembly 1. An angle α1 is formed between the reflection surface 111 and the bottom surface 112, where 0°<α<90°. As shown in FIG. 4, for some large-angle light (e.g., light R14) emitted from the light-emitting element 30, the reflection surface 111 can adjust the propagation direction of these light by reflection to avoid the mutual crosstalk between these large-angle light and other light emitted from the light-emitting element 30 at other positions. Exemplarily, as shown in FIG. 4, after the light R14 is reflected by the reflection surface 111, the reflected light can be directed to the converging portion 122, and can be deflected towards the edge S of the aperture H after the action of the converging portion 122, thereby further increasing the brightness at the position adjacent to the edge S of the aperture H.

Exemplarily, as shown in FIG. 2, FIG. 3, and FIG. 4, the reflection surface 111 surrounds the aperture H. That is, the reflection portion 11 forms a reflection cup structure with a cup-like shape.

Exemplarily, as shown in FIG. 2, FIG. 3, and FIG. 4, the reflection surface 111 surrounds the converging portion 122, and the converging portion 122 surrounds the diverging portion 121.

Exemplarily, as shown in FIG. 4, the reflection surface 111 includes a first portion 1111 and a second portion 1112. The second portion 1112 is located at a side of the first portion 1111 adjacent to the light-exiting side 102 of the light guide plate assembly 1. The first portion 1111 is not in contact with the converging portion 122, and the second portion 1112 is in contact with the converging portion 122. With such a configuration, the second portion 1112 firstly reflects part of large-angle light emitted from the light-emitting element 30, after the propagation direction of this part of large-angle light is adjusted due to the refection, the converging portion 122 can continue to act on this part of light to make this part of light be converged towards the edge S of the aperture H, thereby further increasing the light intensity at the position adjacent to the edge of the aperture H.

Exemplarily, as shown in FIG. 2, FIG. 3, and FIG. 4, in a direction perpendicular to the plane of light guide plate assembly 1, the diverging portion 121 does not overlap with the reflection surface 111, to avoid the reflection of small-angle light by the reflection surface 111, thereby reducing the loss of small-angle light caused by reflection.

Exemplarily, as shown in FIG. 2, FIG. 3, and FIG. 4, in some embodiments of the present disclosure, a surface of the converging portion 122 adjacent to the light-incoming side of the light guide plate assembly 1 can have a curvature greater than 0. That is, as shown in FIG. 4, the converging portion 122 includes a convex lens 1220 adjacent to a side of the light-emitting element 30, and the convex lens 1220 is located at a side of the transmission portion 12 adjacent to the light-incoming side 101 of the light guide plate assembly 1.

Exemplarily, as shown in FIG. 4, the reflection surface 111 includes a first edge S1 adjacent to the light-exiting side 102 of the light guide plate assembly 1 and a second edge S2 adjacent to the light-incoming side 101 of the light guide plate assembly 1. The first edge S1 is the edge S of the aperture H adjacent to the light-exiting side 102 of the light guide plate assembly 1. In a direction parallel to the plane of the light guide plate assembly 1, the second edge S2 is located at a side of the first edge S1 adjacent to the center of the aperture H.

When arranging the convex lens 1220, in some embodiments of the present disclosure, the focus $O_1$ of the convex lens 1220 can be disposed on the first edge S1, that is, the focus $O_1$ overlaps with the first edge S1. With such a configuration, the light directed to the convex lens 1220 can be converged at the position of the edge S of the aperture after passing through the convex lens 1220, thereby increasing the brightness at the position of the edge S of the aperture H.

It should be noted that in the light guide plate assembly 1, the first edge S1 can be a closed ring that surrounds the aperture H. In the section view of the light guide plate assembly 1 indicated by FIG. 4, the position of the first edge S1 is schematically shown by an upper endpoint of the reflection surface 111 adjacent to the aperture H.

Alternatively, in some embodiments of the present disclosure, the focus $O_1$ of the convex lens 1220 can be disposed to avoid the non-aperture position of the reflection portion 11. In some embodiments of the present disclosure, as shown in FIG. 4, the focus $O_1$ of the convex lens 1220 can be disposed at a side of the reflective surface 111 adjacent to the light-exiting side 102 of the light guide plate assembly 1. FIG. 4 schematically shows that the focus $O_1$ of the convex lens 1220 is disposed directly above the first edge S1. In FIG. 4, the focus $O_1$ of the convex lens 1220 is located at a side of the reflection portion 11 adjacent to the light-exiting side 102 of the light guide plate assembly 1, and an orthographic projection of the focus $O_1$ of the convex lens 1220 onto the plane of the light guide plate assembly 1 is disposed on the first edge S1.

In the embodiments of the present disclosure, the focus $O_1$ of the convex lens 1220 is disposed to avoid the non-aperture position of the reflection portion 11, or the focus $O_1$ of the convex lens 1220 is disposed on the first edge S1, so that the light directed to the convex lens 1220 can be prevented from converging into the reflection portion 11. Due to the loss of light when the light is reflected, such a configuration can reduce the loss of the converged light when exiting from the light guide plate assembly 1, thereby increasing the light intensity utilization rate of the backlight module 100 including the light guide plate assembly 1. Moreover, With such a configuration, on the basis of increasing the light intensity at the position adjacent to the edge S of the aperture H, the small-angle light emitted from the light-emitting element 30 can be directed to the reflection surface 111 as little as possible after passing through the transmission portion 12, thereby reducing the loss of the small-angle light caused by reflection.

When arranging the diverging portion 121, in some embodiments of the present disclosure, as shown in FIG. 2, FIG. 3, and FIG. 4, the curvature of the surface of the diverging portion 121 adjacent to the light-incoming side 101 of the light guide plate assembly 1 can be smaller than 0. That is, as shown in FIG. 4, the diverging portion 121 includes a concave lens 1210, and the concave lens 1210 is located at a side of the transmission portion 12 adjacent to the light-incoming side 101 of the light guide plate assembly 1.

Figure 5:
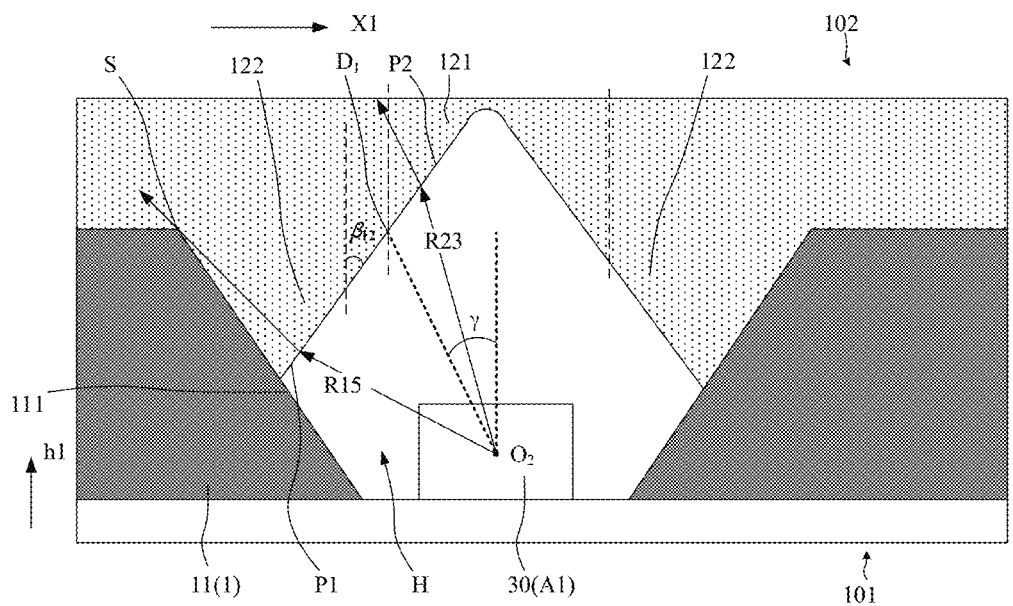
FIG. 5 is a sectional view of a light guide plate unit according to another embodiment of the present disclosure.

FIG. 5 is a sectional view of a light guide plate unit according to another embodiment of the present disclosure. In some embodiments of the present disclosure, as shown in FIG. 5, a surface of the converging portion 122 adjacent to a light-incoming side 101 of the light guide plate assembly 1 includes a first surface P1. A curvature of the first surface P1 can be set to 0, and along a direction X1 from the edge of the aperture H to a center of the aperture H, a distance between the first surface P1 and a light-exiting surface of the light guide plate assembly 1 gradually decreases. The light-exiting surface of the light guide plate assembly 1 is a surface of the light guide plate assembly 1 adjacent to the light-exiting side 102. That is, the first surface P1 is inclined relative to the plane of the light guide plate assembly 1, so that an angle is formed between the first surface P1 and the plane of the light guide plate assembly 1. As shown in FIG. 5, a shape of the first surface P1 in a cross-sectional view is a straight line.

For part of the large-angle light emitted from the light-emitting element 30 towards the first surface P1, taking the light R15 shown in FIG. 5 as an example, compared with the incoming light, the refracted light obtained after the light R15 passes through the first surface P1 is deflected towards a direction closer to the edge S of the aperture H, thereby increasing the light intensity at the position of the edge S of the aperture H.

For part of the small-angle light emitted from the light-emitting element 30 towards the first surface P1, taking the light R23 shown in FIG. 5 as an example, after passing through the first surface P1, the refracted light corresponding to the light R23 can avoid the reflection surface 111 to exit after passing through the transmission portion 12. Such a configuration can reduce the loss of small-angle light caused by reflection.

Exemplarily, the first surface P1 can be a side surface of a circular platform structure or a prism structure.

In some embodiments of the present disclosure, referring to FIG. 5, a surface of the diverging portion 121 adjacent to a light-incoming side 101 of the light guide plate assembly 1 includes a second surface P2. A curvature of the first surface P2 can be set to 0. Along a direction X1 from the edge of the aperture H to a center of the aperture H, a distance between the second surface P2 and a light-exiting surface of the light guide plate assembly 1 gradually decreases. For light emitted from the light-emitting element 30 towards the transmission portion 12, taking the light R23 shown in FIG. 5 as an example, compared with the incoming light, the refracted light obtained after the light R23 passes through the second surface P2 is deflected towards a direction away from the center of the aperture H, so that the light intensity at the center of the aperture H can be reduced. Therefore, the light intensity at the center of the aperture H tends to be consistent with the light intensity at the edge of the aperture H.

Exemplarily, in some embodiments of the present disclosure, the second surface P2 and the first surface P1 can be a side surface of a same circular platform structure or a same prism structure. That is, there is no inflection point between the first surface P1 and the second surface P2, so as to facilitate the processing of the diverging portion 121 and the converging portion 122.

Figure 6:
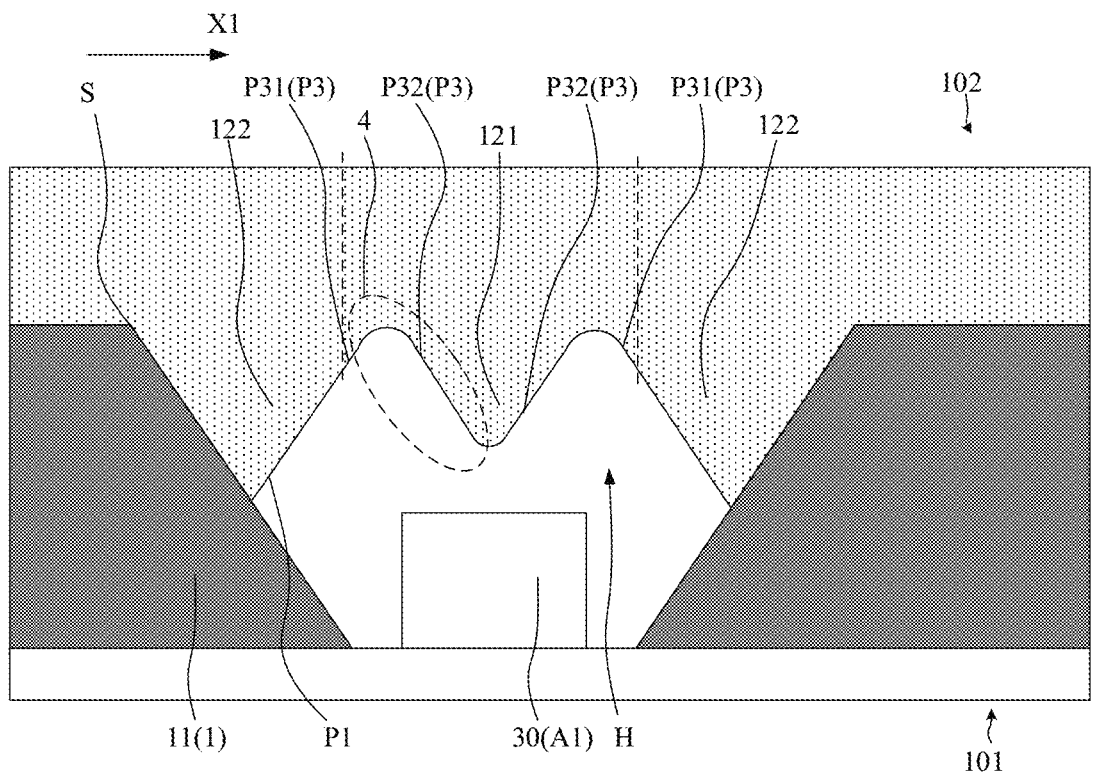
FIG. 6 is a sectional view of a light guide plate unit according to another embodiment of the present disclosure.

FIG. 6 is a sectional view of a light guide plate unit according to another embodiment of the present disclosure. Exemplarily, as shown in FIG. 6, the diverging portion 121 includes a third surface P3 adjacent to the light-incoming side 101 of the light guide plate assembly 1. Along the direction X1 from the edge S of the aperture H towards the center of the aperture H, a distance between the third surface P3 and the light-exiting surface of the light guide plate assembly 1 decreases and then increases, that is, the third surface P3 includes an undulation structure 4 as shown in FIG. 6. With such a configuration, while improving the consistency between the light intensity at the center of the aperture H and the light intensity at the edge S of the aperture H, a distance between the center of the diverging portion 121 and the light-exiting surface of the light guide plate assembly 1 can be increased, thereby avoiding an optical bright spot at the center of the diverging portion 121. Therefore, an image quality of the display module including the light guide plate assembly 1 can be improved.

It should be noted that between the edge and the center of the diverging portion 121, an undulation structure 4 provided at the third surface P3 is only an illustration in FIG. 6. Under a premise of satisfying a distance between the center of the diverging portion 121 and the light-exiting surface of the light guide plate assembly 1, two or more undulation structures 4 can be provided at the third surface P3 between the edge and the center of the diverging portion 121, and the number of the undulation structures is not limited in the present disclosure.

Exemplarily, as shown in FIG. 6, the third surface P3 includes a first sub-surface P31 adjacent to the first surface P1, and the first sub-surface P31 has a same curvature as the first surface P1. For example, the curvature of the first sub-surface P31 and the curvature of the first surface P1 can be 0, respectively. With such a configuration, a same processing process can be used to form the first surface P1 and the first sub-surface P31.

In some embodiments of the present disclosure, as shown in FIG. 6, the third surface P3 further includes a second sub-surface P32 adjacent to the center of aperture H, and the second sub-surface P32 has a V-shaped section.

Figure 7:
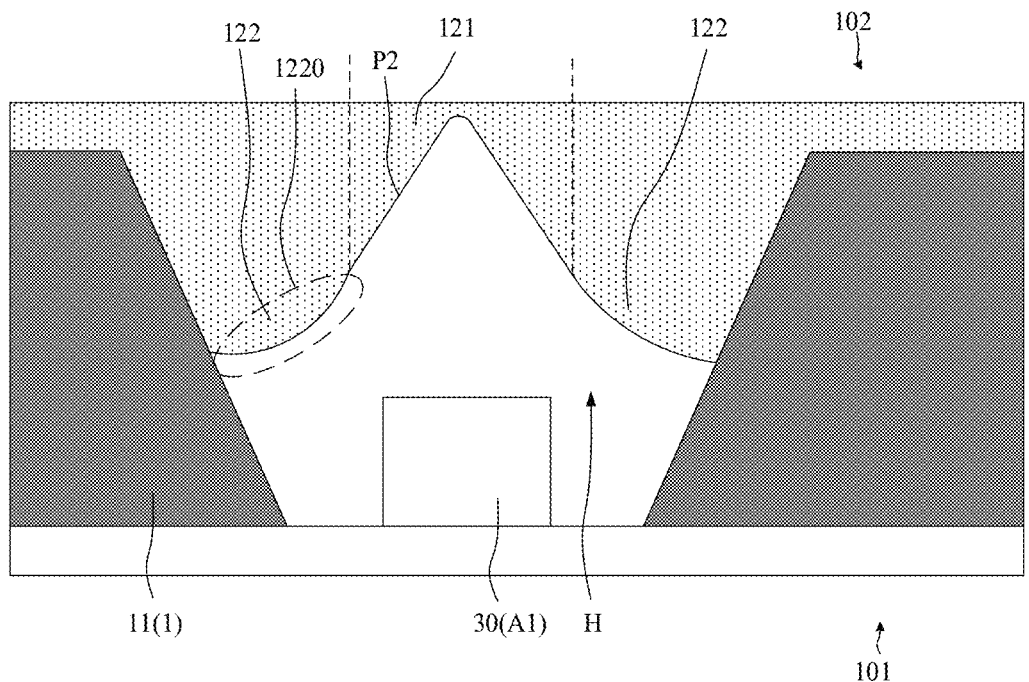
FIG. 7 is a sectional view of a light guide plate unit according to another embodiment of the present disclosure.

It should be noted that the structures shown in FIG. 4, FIG. 5, and FIG. 6 are merely an illustration. FIG. 7 is a sectional view of a light guide plate unit according to another embodiment of the present disclosure. As shown in FIG. 7, the converging portion 122 can include a convex lens 1220, and the curvature of the second surface P2 of the diverging portion 121 can be set to 0. FIG. 7 schematically shows that the diverging portion 121 has an inverted V-shape. Alternatively, the diverging portion 121 can have an M-like shape, which is not shown in the drawings.

Figure 8:
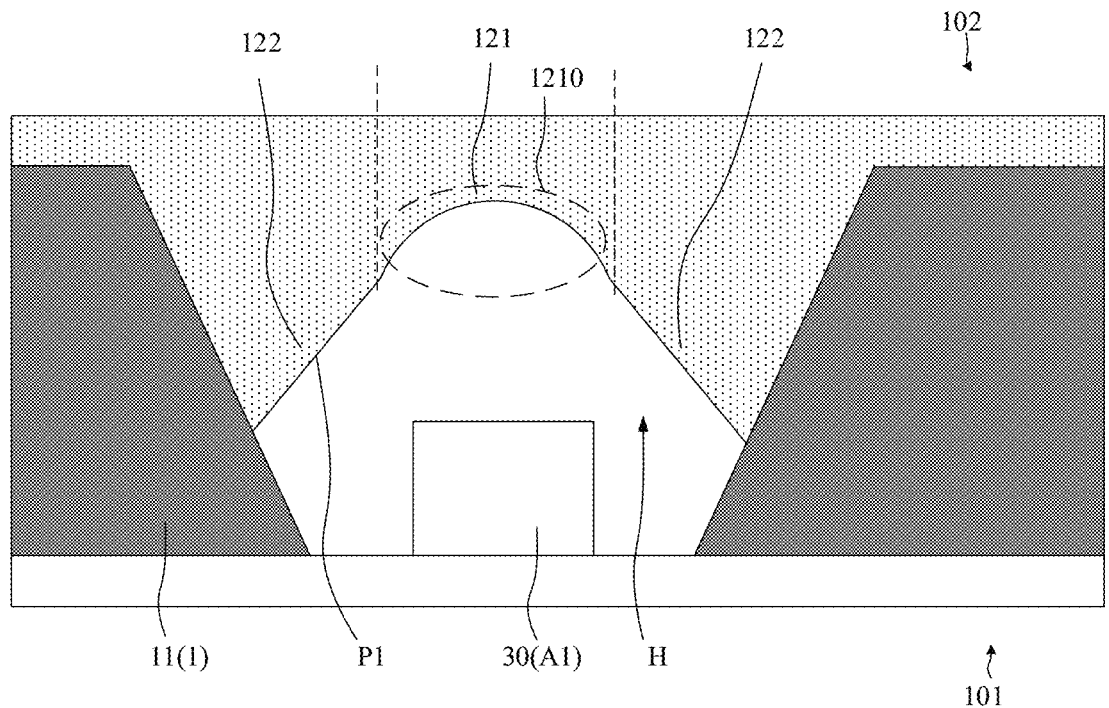
FIG. 8 is a sectional view of a light guide plate unit according to another embodiment of the present disclosure.

FIG. 8 is a sectional view of a light guide plate unit according to another embodiment of the present disclosure. In some embodiments of the present disclosure, as shown in FIG. 8, the curvature of the first surface P1 of the converging portion 122 can be set to 0, and the diverging portion 121 includes a concave lens 1210.

Figure 9:
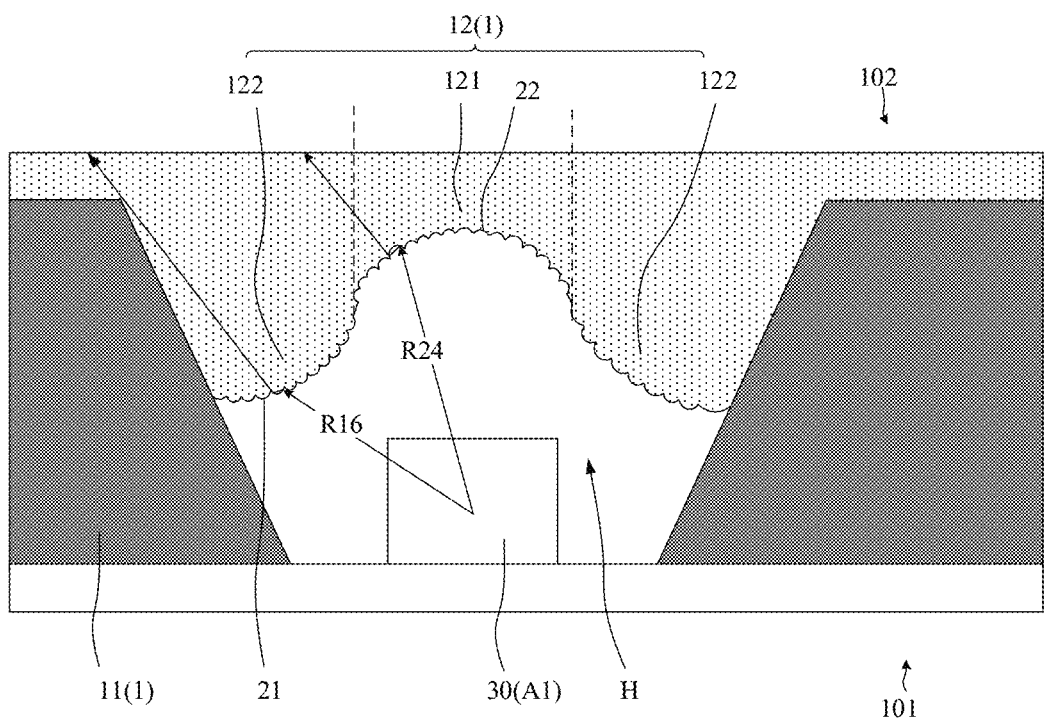
FIG. 9 is a sectional view of a light guide plate unit according to another embodiment of the present disclosure.

FIG. 9 is a sectional view of a light guide plate unit according to another embodiment of the present disclosure. In some embodiments of the present disclosure, as shown in FIG. 9, a surface of the converging portion 122 adjacent to the light-incoming side 101 of the light guide plate assembly 1 includes a first microstructure 21. The first microstructure 21 can make the propagation direction of part of large-angle light (e.g., large-angle light R16 shown in FIG. 9) emitted from the light-emitting element 30 to be adjusted for multiple times in the converging portion 122. In the embodiments of the present disclosure, by treating the surface of the converging portion 122, the first microstructure 21 is provided at the surface of the converging portion 122 adjacent to the light-incoming side 101 of the light guide plate assembly 1. In this way, more large-angle light can converge to the position adjacent to the edge of the aperture H, thereby further increasing the brightness at the edge of the aperture H, so that the light intensity at the edge of the aperture H further tends to be consistent with the light intensity at the center of the aperture H. Moreover, the first microstructure 21 can also scatter the light that reaches the surface of the first microstructure 21, so that the uniformity of the light emitted from different positions of the converging portion 122 can be further improved.

Exemplarily, as shown in FIG. 9, the first microstructure 21 includes a protruding structure. The protruding structure protrudes from the converging portion 122 towards the light-incoming side 101 of the light guide plate assembly 1. The protruding structure is equivalent to a convex lens. The protruding structure can make multiple beams of light that reaches the surface of the protruding structure be converged in the protruding structure, and this converging effect can overlay the converging effect of the converging portion 122 to further increase the light intensity of the light directed to the edge of the aperture H.

In some embodiments of the present disclosure, the protruding structure can have a cone shape and/or a semi-oval sphere shape. FIG. 9 schematically shows a cross-sectional view in which the protruding structure has a semi-oval sphere shape.

Exemplarily, as shown in FIG. 9, a surface of the diverging portion 121 adjacent to the light-incoming side 101 of the light guide plate assembly 1 includes a second microstructure 22. The second microstructure 22 can make the propagation direction of part of small-angle light (e.g., small-angle light R24 shown in FIG. 9) emitted from the light-emitting element 30 be adjusted multiple times in the diverging portion 121. With such a configuration, more small-angle light can be directed towards a direction away from the center of the aperture H, so that the light intensity at the center of the aperture H is further consistent with the light intensity at the edge of the aperture H. Moreover, the second microstructure 22 can also scatter the light that reaches the surface of the second microstructure 22, so that the uniformity of the light emitted from different positions of the diverging portion 121 can be further improved.

In some embodiments of the present disclosure, as shown in FIG. 9, the second microstructure 22 includes a concave structure. The concave structure is recessed towards the light-exiting side 102 of the light guide plate assembly 1. The concave structure is equivalent to a concave lens. The concave structure can diverge multiple beams of light that reaches the surface of the concave structure, and this diverging effect can overlay the diverging effect of the diverging portion 121, so that the light intensity of the light directed to the center of the aperture H can be further reduced.

Exemplarily, the concave structure can have a cone and/or a semi-oval sphere shape. FIG. 9 schematically shows a cross-sectional view in which the concave structure has a semi-oval sphere shape.

Figure 10:
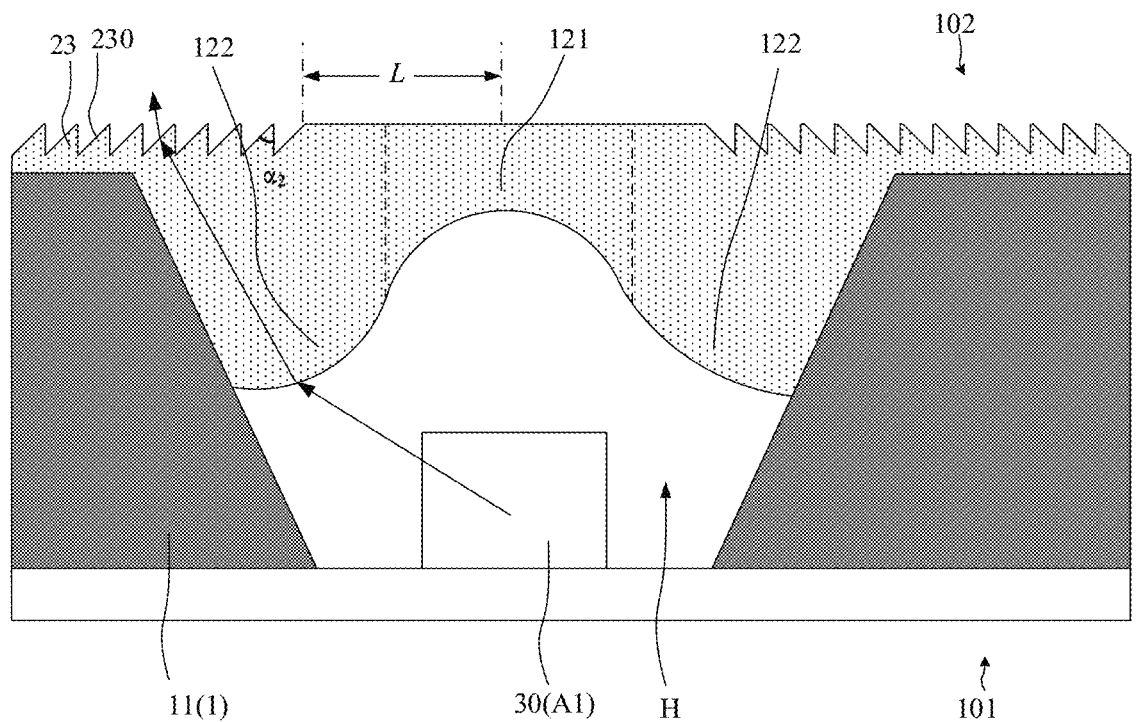
FIG. 10 is a sectional view of a light guide plate unit according to another embodiment of the present disclosure.
Figure 11:
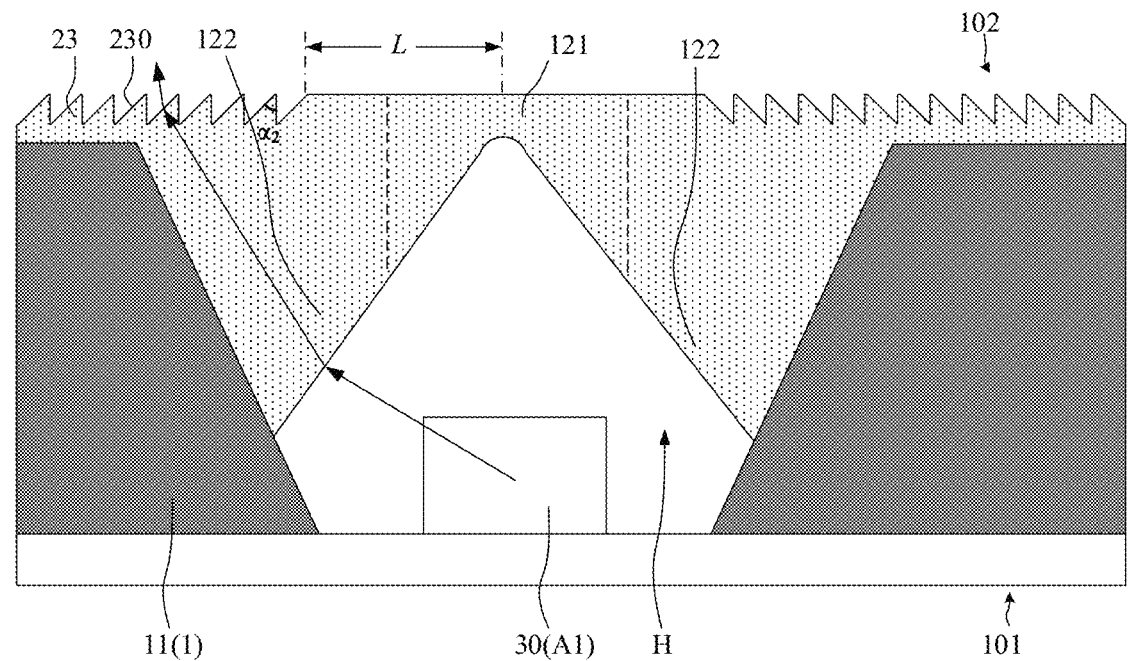
FIG. 11 is a sectional view of a light guide plate unit according to another embodiment of the present disclosure.

FIG. 10 is a sectional view of a light guide plate unit according to another embodiment of the present disclosure, and FIG. 11 is a sectional view of a light guide plate unit according to another embodiment of the present disclosure. Exemplarily, as shown in FIG. 10 and FIG. 11, a surface of the transmission portion 12 adjacent to the light-exiting side 102 of the light guide plate assembly 1 includes a third microstructure 23. Along a direction parallel to the plane of the light guide plate assembly 1, a distance L between the third microstructure 23 and the center of the aperture H is greater than 0. When light reaches the surface of the transmission portion 12 adjacent to the light-exiting side 102 of the light guide plate assembly 1, compared with configuring this surface to be a flat surface, the third microstructure 23 can reduce the incident angle of the incoming light, that is, an angle formed between the incoming light and a normal line of the surface of the transmission portion 12 adjacent to the light-exiting side 102 of the light guide plate assembly 1 is reduced, so that the incident angle of the incoming light is smaller than a critical angle that would cause total reflection. In this way, the incoming light can exit from the light guide plate assembly normally, and the utilization rate of light emitted from the light-emitting element 30 can be improved, thereby avoiding total reflection during the process of exiting from the light guide plate assembly 1 and reducing the light loss.

Exemplarily, the third microstructure 23 includes a cone and/or a semi-oval sphere shape. FIG. 10 and FIG. 11 show a cross-sectional view in which the third microstructure 23 has a cone shape.

Exemplarily, in some embodiments of the present disclosure, any one of the first microstructure 21, the second microstructure 22, and the third microstructure 23 can be processed by means of mechanical processing and/or etching. For example, in some embodiments of the present disclosure, any one of the first microstructure 21, the second microstructure 22, and the third microstructure 23 that have a shape of a cone and/or a semi-oval sphere shape can be formed at the surface of the light guide plate assembly 1 by a shaping mold. In some embodiments of the present disclosure, when forming the second microstructure 22 having the concave structure, convex points can be formed by etching at the surface of the mold by means of an etching process, after that, when forming the transmission portion 12 by means of an injection molding process, the concave structure can be formed at the surface of the diverging portion 121.

Exemplarily, in some embodiments of the present disclosure, the reflection portion 11 and the transmission portion 12 can be formed separately, and then bonded together by means of a colloid to improve the bonding firmness.

Alternatively, in some embodiments of the present disclosure, the reflection portion 11 and the transmission portion 12 can be formed into one piece, to simplify the molding process of the light guide plate assembly 1, and to improve the bonding firmness between the reflection portion 11 and the transmission portion 12. Moreover, with such a configuration, there is no need to provide a glue frame for fixing the refection portion 11 and the transmission portion 12. When the light guide plate assembly 1 is used for a backlight module, the border of the backlight module can be narrower. For example, the reflection portion 11 and the transmission portion 12 can be formed into one piece by an injection molding process.

Exemplarily, the above reflection portion 11 includes a white material to increase the reflectivity of the reflection portion 11. Exemplarily, the reflection portion 11 includes acrylic or polycarbonate (PC).

Exemplarily, the transmission portion 12 includes a transparent material, to make the transmission portion 12 have a high transmission rate for ensuring the transmission effect of the light.

Figure 12:
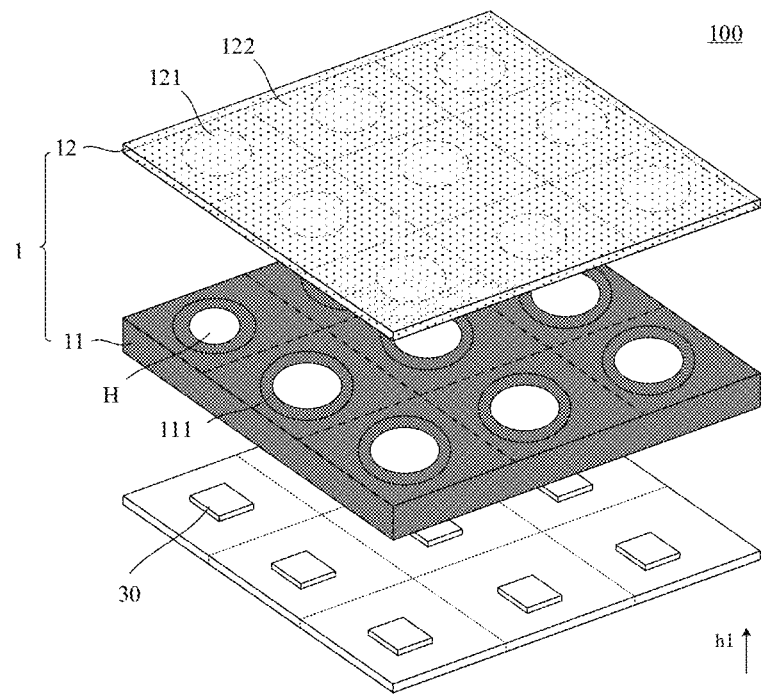
FIG. 12 is a layer diagram of a backlight module according to an embodiment of the present disclosure.

The present disclosure further provides a backlight module. FIG. 12 is a layer diagram of a backlight module 100 according to an embodiment of the present disclosure. Referring to FIG. 3, FIG. 4, and FIG. 12, the backlight module 100 includes a light-emitting element 30 and the light guide plate assembly 1. The light guide plate assembly 1 is located at the light-exiting side of the light-emitting element 30.

When the backlight module 100 works, the light-emitting element 30 emits light. The light emitted from the light-emitting element 30 is directed to the display panel located at the light-exiting side of the light guide plate assembly 1 after the light guide effect of the light guide plate assembly 1, so as to display images by the display device.

In the backlight module 100 provided by the embodiments of the present disclosure, the light guide plate assembly 1 includes the transmission portion 12 and the reflection portion 11, and the transmission portion 12 includes the diverging portion 121 and the converging portion 122. When applied to the backlight module, the light intensity of the light emitted from an area adjacent to the edge S of the aperture of the reflection portion 11 in the light guide plate assembly 1 can be increased, thereby balancing the light intensity of light emitted from different positions such as an area provided with the light-emitting element 30 and an area not provided with the light-emitting element 30, so that a visible mesh pattern caused by uneven light intensity can be avoided.

Moreover, based on the configuration provided by the embodiments of the present disclosure, a visible mesh pattern can be avoided without needing to arrange a diffusion plate in the light guide plate assembly 1, thereby saving the cost of the backlight module 100 and reducing the thickness of the backlight module 100.

Exemplarily, as shown in FIG. 3 and FIG. 12, the backlight module 100 includes multiple light-emitting elements 30. Multiple light-emitting elements 30 are arranged in an array in a plane of the backlight module 100. Exemplarily, the light-emitting element 30 includes a Mini LED chip.

Exemplarily, as shown in FIG. 3 and FIG. 12, in the backlight module 100, the reflection surface 111 of the light guide plate assembly 1 surrounds the light-emitting element 30. With such a configuration, the reflection surface 111 can reflect more large-angle light emitted from the light-emitting element 30, so that the utilization rate of the light emitted from the light-emitting element 30 can be increased, thereby reducing the mutual crosstalk of the light emitted from different light-emitting elements 30.

It is only a schematically example that FIG. 12 shows that a shape of the orthographic projection of the light-emitting element 30 onto the plane of the backlight module 100 is a quadrangle and a shape of the orthographic projection of the aperture H of the reflection portion 11 onto the plane of the backlight module 100 is a circle, and the shape of the orthographic projection of the light-emitting element 30 and the shape of the orthographic projection of the aperture H onto the plane of the backlight module 100 can be configured according to different design requirements in the embodiments of the present disclosure.

Exemplarily, as shown in FIG. 4, along a direction parallel to the plane of the light guide plate assembly 1, the reflection portion 11 and light-emitting elements 30 at least partially overlap with each other, that is, at least part of the light-emitting element 30 can be embedded in the light guide plate assembly 1. Such a configuration is conductive to a thinning design of the backlight module 100.

Exemplarily, as shown in FIG. 4, the light-emitting element 30 is located at a side of the transmission portion 12 adjacent to the light-incoming side 101 of the light guide plate assembly 1, and at least part of the light-emitting element 30 is located in the aperture H to reduce the thickness of the backlight module 100.

Exemplarily, as shown in FIG. 4, the light-emitting element 30 is located at a side of the diverging portion 121 adjacent to the light-incoming side 101 of the light guide plate assembly 1.

Exemplarily, as shown in FIG. 4, along a thickness direction of the backlight module 100, the light-emitting element 30 and the diverging portion 121 at least partially overlap with each other. Such a configuration can diverge the small-angle light emitted from the light-emitting element 30 by using the diverging portion 121, so as to balance brightness difference between a position where the backlight module 100 is provided with the light-emitting element 30 and a position where the backlight module 100 is not provided with the light-emitting element 30.

Exemplarily, as shown in FIG. 4, along the thickness direction of the backlight module 100, the light-emitting element 30 does not overlap with the converging portion 122, to avoid that the small-angle light emitted from the light-emitting element 30 is further converged by the converging portion 122.

Exemplarily, as shown in FIG. 4 and FIG. 5, the converging portion 122 includes a first end $D_1$ adjacent to the diverging portion 121. An angle formed between a connection line $D_1O_2$ connecting the first end $D_1$ and a geometric center $O_2$ of the light-emitting element 30 and the thickness direction h1 of the backlight module 100 is greater than equal to 20°. Such a configuration can reduce the amount of small-angle light emitted from the light-emitting element 30 that is received by the converging portion 122.

When the converging portion 122 includes a convex lens, in some embodiments of the present disclosure, the position and specification of the convex lens can be configured based on the specification of the light-emitting element 30.

Figure 13:
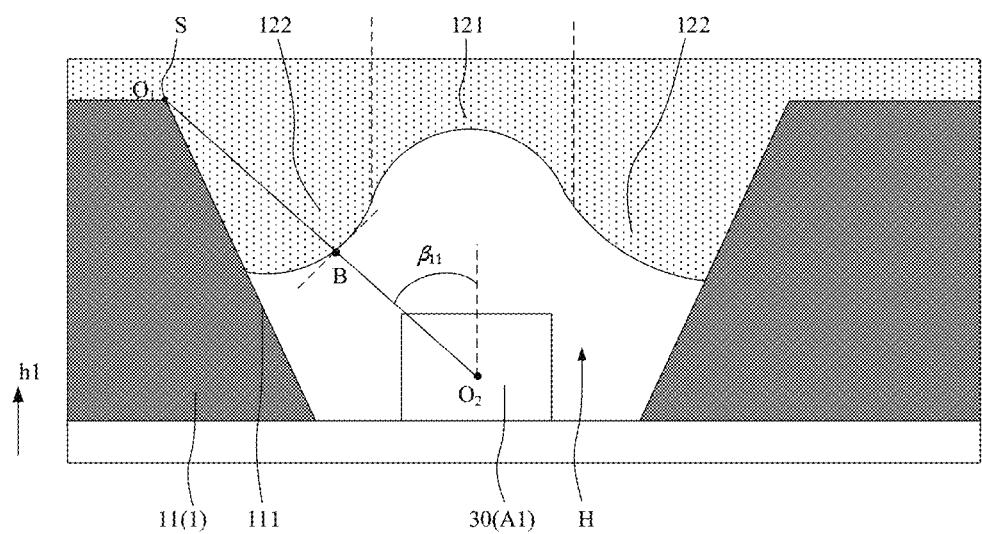
FIG. 13 is a sectional view of a light guide plate unit according to another embodiment of the present disclosure.

FIG. 13 is a sectional view of a light guide plate unit according to another embodiment of the present disclosure. In some embodiments of the present disclosure, as shown in FIG. 13, an angle $\beta_{11}$ is formed between a connection line connecting the focus $O_1$ of the convex lens and the center $O_2$ of the light-emitting element 30 and the thickness direction h1 of the backlight module 100. In some embodiments of the present disclosure, a critical light-exiting angle (not shown in FIG. 13) of light emitted from the light-emitting element that satisfies a preset light intensity condition is $\beta_2$. In some embodiments of the present disclosure, when configuring the convex lens, $\beta_{11}=\beta_2$.

Exemplarily, the preset light intensity condition can be configured according to different optical performance requirements of the backlight module 100. For example, in some embodiments of the present disclosure, the preset light intensity condition can be defined as a light intensity greater than or equal to half of the maximum light intensity. The light intensity of the light-emitting element 30 is correlated to the light-exiting angle of light emitted from the light-emitting element 30. Usually, the larger the light-exiting angle is, the smaller the light intensity will be. When the light-exiting angle is equal to 0, that is, when the light-exiting direction is parallel to the normal line of the light-exiting surface of the light-emitting element, the light intensity is the largest. When the preset light intensity condition is that the light intensity is greater than or equal to half of the maximum light intensity, the critical light-exiting angle $\beta_2$ herein indicates that the light-emitting intensity is greater than or equal to half of the maximum light-emitting intensity when the light-exiting angle is smaller than or equal to $\beta_2$.

In some embodiments of the present disclosure, $\beta_{11}=\beta_2$. On the one hand, the light within the critical light-exiting angle emitted from the light-emitting element 30 after passing through the convex lens can exit from a side of the connection line $O_1O_2$ away from the reflection surface 111 as far as possible, that is, the light within the critical light-exiting angle emitted from the light-emitting element 30 can be directed to the reflection surface 111 as little as possible, and exit from the light guide plate assembly 1 directly after passing through the transmission portion 12 as much as possible, so as to reduce the light loss caused by reflection of the reflection surface 111 and thus improve the light intensity utilization rate. On the other hand, for the light with an angle greater than the critical light-exiting angle emitted from the light-emitting element, based on this configuration, this part of light can be directed from a side of the connection line $O_1O_2$ adjacent to the reflection surface 111 towards the convex lens as far as possible so as to be converged, which is conductive to increasing the light intensity at the position adjacent to the edge S of the aperture H.

When the converging portion 122 includes a convex lens, in some embodiments of the present disclosure, as shown in FIG. 13, the connection line $O_1O_2$ connecting the focus $O_1$ of the convex lens and the center $O_2$ of the light-emitting element 30 intersects with the convex lens at a first intersection B. A tangent line of the convex lens at the first intersection B is perpendicular to the connection line $O_1O_2$ connecting the focus $O_1$ of the convex lens and the center $O_2$ of the light-emitting element 30. With such a configuration, on the one hand, the light emitted from the light-emitting element 30 and propagating at a side of the connection line $O_1O_2$ adjacent to the center of the aperture H can exit after passing through the transmission portion 12 as much as possible, and be directed to the reflection surface 111 as little as possible, so as to reduce the light loss caused by reflection of the reflection surface 111 and thus improve the light intensity utilization rate. On the other hand, for the light with an angle greater than the critical light-exiting from emitted from the light-emitting element 30, based on this configuration, this part of light can be directed from a side of the connection line $O_1O_2$ adjacent to the reflection surface 111 towards the convex lens as far as possible so as to be converged, which is conductive to increasing the light intensity at the position adjacent to the edge S of the aperture H.

The curvature of the converging portion 122 adjacent to the light-incoming side 101 of the light guide plate assembly 1 is 0, and along a direction X1 from the edge of the aperture H to a center of the aperture H, a distance between the first surface P1 and the light-exiting surface of the light guide plate assembly 1 decreases gradually. In this case, as shown in FIG. 5, an angle $\beta_{12}$ is formed between the first surface P1 and the thickness direction h1 of the backlight module 100, and a critical light-exiting angle of the light emitted from the light-emitting element 30 that satisfies a preset light intensity condition is defined as $\beta_2$ (not shown). In some embodiments of the present disclosure, $\beta_{12}+\beta_2=90°$. That is, the first surface P1 is perpendicular to the propagation direction of the light with the critical light-exiting angle. With such a configuration, on the one hand, the light within the critical light-exiting angle emitted from the light-emitting element 30 can exit after passing through the transmission portion 12 as much as possible, and be directed to the reflection surface 111 as little as possible, so as to reduce the light loss caused by reflection of the reflection surface 111 and thus improve the light intensity utilization rate. On the other hand, for the light with an angle greater than the critical light-exiting angle emitted from the light-emitting element 30, based on this configuration, this part of light can be converged by the converging portion 122 as much as possible, which is conductive to increasing the light intensity at the position adjacent to the edge S of the aperture H.

Exemplarily, referring to FIG. 10 and FIG. 11, a surface of the transmission portion 12 adjacent to a light-exiting side 102 of the light guide plate assembly 1 includes a third microstructure 23, and along a direction parallel to a plane of the light guide plate assembly 1, a distance between the third microstructure 23 and the center of the aperture H is defined as L. The distance L between the third microstructure 23 and the center of the aperture H refers to the shortest distance between the third microstructure 23 and the center of the aperture H. In some embodiments of the present disclosure, L>0.

Exemplarily, a critical light-exiting angle of the light emitted from the light-emitting element 30 that satisfies a preset light intensity condition is defined as $\beta_2$, a refractive index of the transmission portion 12 is defined as $n_1$, a refractive index of a medium at a side of the light guide plate assembly 1 away from the light-emitting element 30 is defined as $n_2$, a refractive index of a medium between the light-emitting element 30 and the transmission portion 12 is defined as $n_3$, a distance between a geometric center of the light-emitting element 30 and a light-exiting surface of the light guide plate assembly 1 is defined as H; then, in some embodiments of the present disclosure, L≥H×tan $\theta_1$, and $$\theta_1 = \beta_2 - \arcsin\left[\frac{n_1}{n_2}\sin\left(\beta_2 - \arcsin\frac{n_3}{n_1}\right)\right].$$

Figure 14:
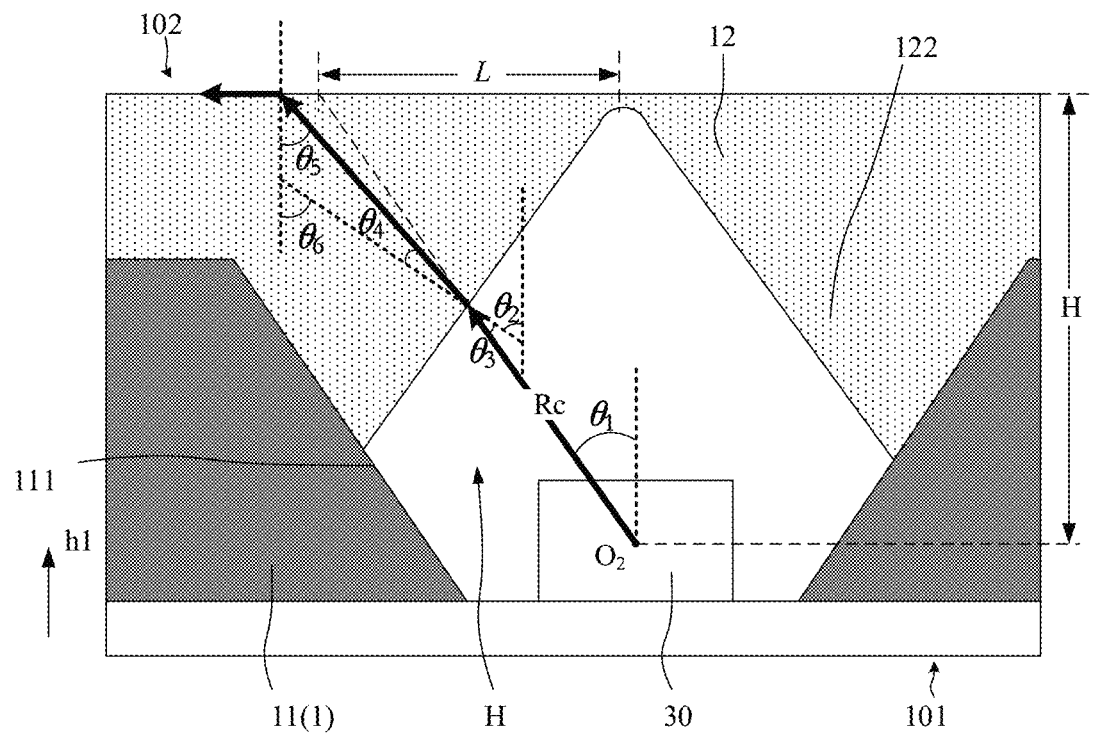
FIG. 14 is a schematic diagram of a position disposing principle of a third microstructure of a light guide plate unit according to an embodiment of the present disclosure.

FIG. 14 is a schematic diagram of a position disposing principle of a third microstructure of a light guide plate unit according to an embodiment of the present disclosure. Referring to FIG. 14, for the critical light Rc emitted from the light-emitting element 30, where the critical light Rc refers to light emitted from the light-emitting element 30 that can have a total reflection when being directed to the light-exiting surface of the light guide plate assembly 1. As shown in FIG. 14, an angle $\theta_1$ is formed between the propagation direction of the critical light Rc and the thickness direction of the light guide plate assembly 1. In some embodiments of the present disclosure, L≥H×tan $\theta_1$, it can ensure that the third microstructure (not shown in FIG. 14) can cover the distribution range of the light-exiting surface of the light that would have total reflection on the light guide plate assembly 1, so that the third microstructure can reduce the incident angle of this part of light when being directed to the light-exiting surface of the light guide plate assembly 1, and this part of light can exit from the guide light guide plate assembly 1.

As shown in FIG. 14, $\theta_1=\theta_2-\theta_3$, where, $\theta_2$ is an angle formed between a normal line of a surface of the transmission portion 12 adjacent to the light-emitting element 30 and the thickness direction h1 of the light guide plate assembly 1; and $\theta_3$ is an angle formed between a normal line of a surface of the transmission portion 12 adjacent to the light-emitting element 30 and the critical light Rc.

Moreover, $n_3 \sin \theta_3 = n_1 \sin \theta_4$ (where $\theta_4$ is an angle formed between the light corresponding to the critical light Rc that emits from the surface of the transmission portion 12 adjacent to the light-emitting element 30 and the thickness direction h1 of the light guide plate assembly 1) and $\theta_6=\theta_4+\theta_5$ (where $\theta_5$ is an angle formed between the propagation direction of the critical light Rc when being directed to the light-exiting surface of the light guide plate assembly 1 and the thickness direction h1 of the light guide plate assembly 1). Since the critical light Rc has a fullreflection when exiting from the light guide plate assembly 1.

$$\theta_5 = \arcsin\frac{n_3}{n_1};$$

$\theta_6$ is an angle formed between a normal line of part of the surface of the transmission portion 12 adjacent to the light-emitting element 30 and the thickness direction h1 of the light guide plate assembly 1.

For example, when part of the surface of the transmission portion 12 adjacent to the light-emitting element 30 is perpendicular to the propagation direction of the light emitted from the light-emitting element 30 with the above critical light-exiting angle $\theta_2$, $\theta_6=\theta_2=\theta_2$. It can be derived from the above that:

$$\theta = \beta_2 - \arcsin\left[\frac{n_1}{n_2}\sin\left(\beta_2 - \arcsin\frac{n_3}{n_1}\right)\right].$$

Exemplarily, the medium located at a side of the light guide plate assembly away from the light-emitting elements 30, and the medium between the light-emitting element 30 and the transmission portion 12 can be air, that is, $n_2=1$, and $n_3=1$.

It should be noted that FIG. 14 merely schematically illustrates the position of the third microstructure by taking the curvature of part of the surface of the transmission portion 12 adjacent to the light-emitting element 30 being 0 as an example. When the curvature of part of the surface of the transmission portion 12 adjacent to the light-emitting element 30 is greater than or smaller than 0, as shown in FIG. 10, the position configuration of the third microstructure 23 is also applicable.

In some embodiments of the present disclosure, as shown in FIG. 10 and FIG. 11, the third microstructure 23 includes saw teeth, each one of which includes an oblique surface 230, an angle $\alpha_2$ formed between the oblique surface 230 and the thickness direction h1 of the light guide plate assembly 1 satisfies $\alpha_2=90°-\theta_1$. With such a configuration, it is equivalent to that, the propagation direction of the critical light with total reflection emitted from the light-emitting element 30 is parallel to a normal direction of the oblique surface 230, thereby increasing the brightness of light perpendicularly emitted from the light-exiting surface of the light guide plate assembly 1.

In some embodiments of the present disclosure, as shown in FIG. 10 and FIG. 11, the saw tooth can include one oblique surface 230. That is, a cross-sectional shape of the saw tooth is a right triangle as shown in FIG. 10 and FIG. 11, and the oblique surface 230 corresponds to the hypotenuse of the right triangle.

Figure 15:
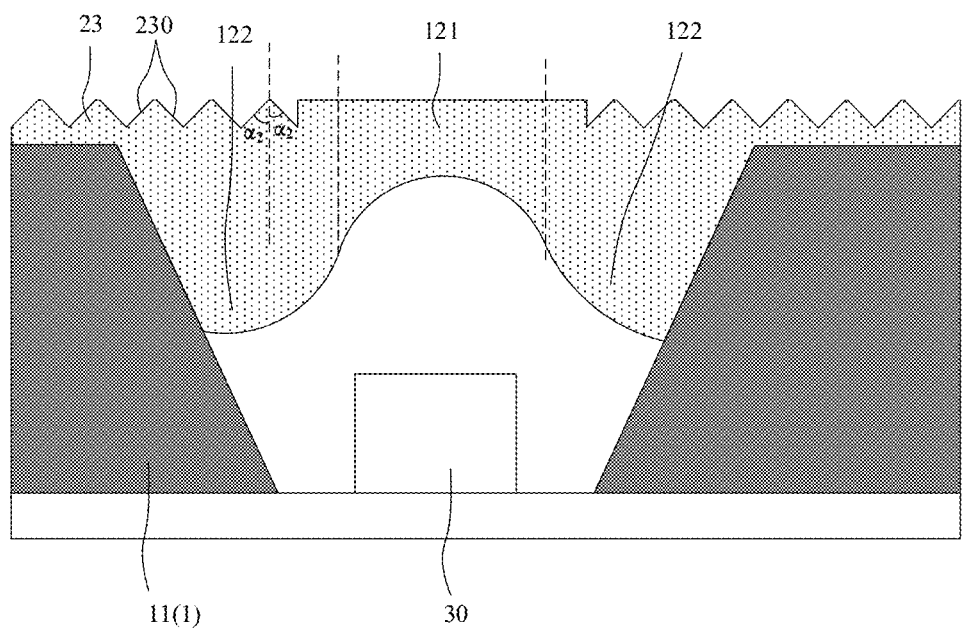
FIG. 15 is a sectional view of a light guide plate unit according to another embodiment of the present disclosure.

FIG. 15 is a sectional view of a light guide plate unit according to another embodiment of the present disclosure. In some embodiments of the present disclosure, as shown in FIG. 15, the saw tooth includes two oblique surfaces 230. That is, the cross-sectional shape of the saw tooth is an isosceles triangle as shown in FIG. 15, and the two oblique surfaces 230 correspond to two waists of the isosceles triangle.

Figure 16:
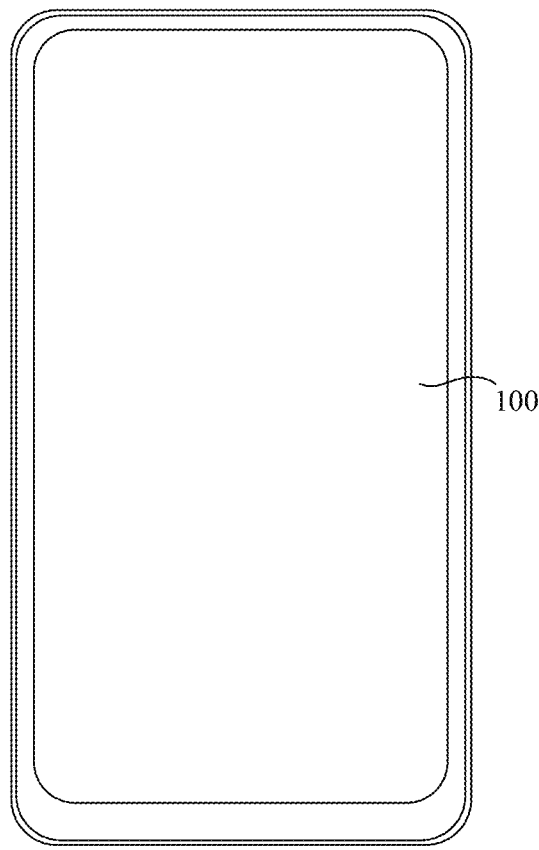
FIG. 16 is a schematic diagram of a display device according to an embodiment of the present disclosure.

The present disclosure further provides a display device. FIG. 16 is a schematic diagram of a display device according to an embodiment of the present disclosure. As shown in FIG. 16, the display device includes a display panel and the backlight module 100 described above. The display panel is located at a light-exiting side of the backlight module 100. The display panel includes a LCD display panel. A structure of the backlight module 100 has been described in detail in the foregoing embodiments, and will not be repeated herein. The display device shown in FIG. 16 is merely a schematic illustration, which can be any electronic device with a display function, such as a mobile phone, a tablet computer, a laptop computer, an e-paper book, or a television.

The above are merely some embodiments of the present disclosure, which, as mentioned above, are not configured to limit the present disclosure. Whatever within the principles of the present disclosure, including any modification, equivalent substitution, improvement, etc., shall fall into the protection scope of the present disclosure.

What is claimed is:

1. A light guide plate assembly, comprising:
   a reflection portion having an aperture; and
   a transmission portion,
   wherein at least part of the transmission portion is located in the aperture; the transmission portion comprises a converging portion and a diverging portion; a curvature of a surface of the converging portion adjacent to a light-incoming side of the light guide plate assembly is greater than or equal to 0, and a curvature of a surface of the diverging portion adjacent to the light-incoming side of the light guide plate assembly is smaller than or equal to 0.

2. The light guide plate assembly according to the claim 1, wherein the reflection portion comprises a reflection surface and a bottom surface that is located at a side adjacent to the light-incoming side of the light guide plate assembly, and an angle $\alpha 1$ is formed between the reflection surface and the bottom surface, where $0°<\alpha 1<90°$.

3. The light guide plate assembly according to claim 1, wherein a surface of the diverging portion adjacent to a light-incoming side of the light guide plate assembly comprises a second microstructure.

4. The light guide plate assembly according to the claim 1, wherein the converging portion comprises a convex lens located at a side of the transmission portion adjacent to the light-incoming side of the light guide plate assembly.

5. The light guide plate assembly according to the claim 4,
   wherein the reflection portion comprises a reflection surface that surrounds the aperture, the reflection surface comprises a first edge adjacent to the light-exiting side of the light guide plate assembly; and
   wherein a focus of the convex lens is located on the first edge or at a side of the reflection surface adjacent to the light-exiting side of the light guide plate assembly.

6. The light guide plate assembly according to the claim 1, wherein a surface of the converging portion adjacent to the light-incoming side of the light guide plate assembly comprises a first surface with a curvature of 0, and a distance between the first surface and the light-exiting surface of the light guide plate assembly decreases along a direction from an edge of the aperture to a center of the aperture.

7. The light guide plate assembly according to the claim 6, wherein a surface of the diverging portion adjacent to the light-incoming side of the light guide plate assembly comprises a second surface with a curvature of 0, and a distance between the second surface and the light-exiting surface of the light guide plate assembly decreases along the direction from the edge of the aperture to the center of the aperture.

8. The light guide plate assembly according to the claim 6, wherein the diverging portion comprises a third surface adjacent to the light-incoming side of the light guide plate assembly, and a distance between the third surface and the light-exiting surface of the light guide plate assembly first decreases and then increases along the direction from the edge of the aperture to the center of the aperture.

9. The light guide plate assembly according to the claim 8, wherein the third surface comprises a first sub-surface adjacent to the first surface, and the first sub-surface and the first surface have a same curvature.

10. The light guide plate assembly according to claim 1, wherein the diverging portion comprises a concave lens located at a side of the transmission portion adjacent to the light-incoming side of the light guide plate assembly.

11. The light guide plate assembly according to claim 1, wherein the diverging portion corresponds to the center of the aperture.

12. The light guide plate assembly according to claim 1, wherein a surface of the transmission portion adjacent to a light-exiting side of the light guide plate assembly comprises a third microstructure, and a distance between the third microstructure and the center of the aperture is greater than 0 in a direction parallel to a plane of the light guide plate assembly.

13. A backlight module, comprising a light-emitting element and the light guide plate assembly according to claim 1, the light guide plate assembly being located at a light-exiting side of the light-emitting element.

14. The backlight module according to the claim 13, wherein the light-emitting element is located at side of the transmission portion adjacent to a light-incoming side of the light guide plate assembly, and at least part of the light-emitting element is located in the aperture.

15. The backlight module according to the claim 13, wherein along a thickness direction of the backlight module, the light-emitting element at least partially overlaps with the diverging portion.

16. The backlight module according to the claim 13, wherein along a thickness direction of the backlight module, the light-emitting element does not overlap with the converging portion.

17. The backlight module according to the claim 13,
   wherein the converging portion comprises a convex lens located at a side of the transmission portion adjacent to a light-incoming side of the light guide plate assembly; and
   wherein an angle formed between a connection line connecting a focus of the convex lens and a center of the light-emitting element and a thickness direction of the backlight module is defined as $\beta_{11}$, and a critical light-exiting angle of light emitted from the light-emitting element that satisfies a preset light intensity condition is defined as $\beta_2$, where $\beta_{11}=\beta_2$.

18. The backlight module according to the claim 13,
   wherein the converging portion comprises a convex lens located at a side of the transmission portion adjacent to a light-incoming side of the light guide plate assembly; and
   wherein a connection line connecting a focus of the convex lens and a center of the light-emitting element intersects with the convex lens at a first intersection point, and a tangent line of the convex lens at the first intersection point is perpendicular to the connection line connecting the focus of the convex lens and the center of the light-emitting element.

19. The backlight module according to the claim 15,
   wherein a surface of the converging portion adjacent to a light-incoming side of the light guide plate assembly comprises a first surface;
   wherein a distance between the first surface and a light-exiting surface of the light guide plate assembly decreases along a direction from an edge of the aperture to the center of the aperture; and
   wherein an angle formed between the first surface and the thickness direction of the backlight module is defined as $\beta_{12}$, and a critical light-exiting angle of light emitted from the light-emitting element that satisfies a preset light intensity condition is defined as $\beta_2$, where $\beta_{12}+\beta_2=90°$.

20. A display device, comprising a display panel and a backlight module,
    wherein the backlight module comprises a light-emitting element and a light guide plate assembly located at a light-exiting side of the light-emitting element,
    wherein the light guide plate assembly comprise a reflection portion having an aperture; and a transmission portion, wherein at least part of the transmission portion is located in the aperture; the transmission portion comprises a converging portion and a diverging portion; a curvature of a surface of the converging portion adjacent to a light-incoming side of the light guide plate assembly is greater than or equal to 0, and a curvature of a surface of the diverging portion adjacent to the light-incoming side of the light guide plate assembly is smaller than or equal to 0 the light guide plate assembly being located at a light-exiting side of the light-emitting element; and wherein the display panel is located at a light-exiting side of the backlight module.

* * * * *